(12) United States Patent
Hashimoto (10) Patent No.: US 6,489,160 B2
(45) Date of Patent: Dec. 3, 2002

(54) METHOD FOR PRODUCING NUCLEIC ACID STRAND IMMOBILIZED CARRIER

(75) Inventor: Koji Hashimoto, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/791,704

(22) Filed: Feb. 26, 2001

(65) Prior Publication Data

US 2001/0024788 A1 Sep. 27, 2001

(30) Foreign Application Priority Data

Mar. 16, 2000 (JP) ........................................ 2000-074490

(51) Int. Cl.[7] .............................. C12M 1/34; C12Q 1/68; C12P 19/34; G01N 33/00; C07H 21/02
(52) U.S. Cl. ........................ 435/287.2; 435/6; 435/91.1; 435/91.2; 435/287.1; 436/94; 536/23.1
(58) Field of Search ........................ 435/6, 91.1, 91.2, 435/91.51, 183, 283.1, 285.2, 286.5, 287.1, 287.2; 436/94; 536/23.1, 24.3, 24.33, 25.3

(56) References Cited

U.S. PATENT DOCUMENTS

| | | | |
|---|---|---|---|
| 5,445,934 A | | 8/1995 | Fodor et al. |
| 5,605,662 A | | 2/1997 | Heller et al. |
| 5,667,667 A | | 9/1997 | Southern |
| 5,776,672 A | | 7/1998 | Hashimoto et al. |
| 5,972,692 A | | 10/1999 | Hashimoto et al. |
| 6,051,380 A | * | 4/2000 | Sosnowski et al. ............ 435/6 |
| 6,180,346 B1 | * | 1/2001 | Thorp et al. .................. 435/6 |

* cited by examiner

Primary Examiner—Ethan C. Whisenant
Assistant Examiner—Frank Lu
(74) Attorney, Agent, or Firm—Oblon, Spivak, McClelland, Maier & Neustadt, P.C.

(57) ABSTRACT

Using carrier having a template nucleic acid strand immobilized thereon, a probe nucleic acid strand is synthesized along the template strand, and the synthesized probe strand is immobilized on a separate substrate by utilizing an electric field to thereby manufacture a nucleic acid strand immobilized array simply and at low costs. By constructing the substrate of the array formed of an electrode, a DNA array enabling electric detection of DNAs can be obtained.

27 Claims, 2 Drawing Sheets

METHOD FOR PRODUCING NUCLEIC ACID STRAND IMMOBILIZED CARRIER

CROSS-REFERENCE TO RELATED APPLICATIONS

This application is based upon and claims the benefit of priority from the prior Japanese Patent Application No. 2000-074490, filed Mar. 16, 2000, the entire contents of which are incorporated herein by reference.

BACKGROUND OF THE INVENTION

The present invention relates to a method for producing a nucleic acid immobilized carrier in which many nucleic acid probes having prescribed nucleotide sequences different from each other are immobilized on a substrate.

Genetic screening technologies using a DNA array have recently attracted remarkable attention (Beattie et al. 1993, Fodor et al. 1991, Khrapko et al. 1989, Southern et al. 1994). This DNA array comprises a carrier which carries $10^1$ to $10^5$ types of DNA probes differing in sequence, said probes being immobilized on the surface of a glass substrate or silicon substrate which is several centimeters by several centimeters square. The DNA array greatly contributes to recent development of genetic analysis technologies. The outline of its principle is summarized as follows.

First, on the DNA array, the DNA probe is reacted with a sample gene which is labeled with a fluorescent dye, radioactive isotope (RI) or the like, thereby to be coupled by hybridization with the sample gene which has a sequence complementary to that of the DNA probe. This ensures that when the sample gene has a sequence complementary to that of the DNA probe on the array, a signal derived from the label is obtained at a specific position on the array. Therefore, if the sequence and position of the DNA probe immobilized on the substrate is known in advance, nucleotide sequences existing in the sample gene can be examined in a simple manner. Also, if the DNA array is used, only one test makes it possible to obtain much information concerning nucleotide sequences. This is the reason why the DNA array is not limited to the gene screening technologies but is expected as sequencing technologies (Pease et al. 1994, Parinov et al. 1996).

On the other hand, with regard to the immobilization of a DNA probe to the substrate, two methods have been reported: (1) a method in which a DNA strand of a DNA probe is extended every single nucleotide one by one on the substrate (U.S. Pat. No. 5,889,165) and (2) a method in which a DNA probe synthesized in advance is immobilized to the substrate (U.S. Pat. No. 5,807,522). In the former method, DNA probes differing in sequence can be immobilized every 20×20 μm at intervals of 100 Å on the substrate surface which is ½ by ½ inches square by utilizing the photolithographic technique, and therefore probe density of about $4 \times 10^5$ types of probe can be achieved (Chee et al. 1996). Because a patterning of about 0.1 μm width is becoming possible at present by the photolithographic techniques, there is the possibility that probes are more integrated in the future. On the other hand, although the latter method has the problem that it is necessary to prepare many types of probe in advance and the degree of integration of probes is lower than that of the former method (every 60×60 μm at intervals of 120 μm), the latter method is superior in reaction efficiency because the probe can be immobilized three-dimensionally in a gel matrix (Guschin et al. 1997). Also, the latter method in which probes are immobilized three-dimensionally in a porous silicon rather than the gel has been reported (Beattie et al. 1995).

As outlined above, the DNA array has, for instance, an advantage that plural data are obtained in one assay. However, because complicated reaction control is required in the production of the DNA array, the conventional DNA array was highly expensive.

BRIEF SUMMARY OF THE INVENTION

The present invention has been made to solve the aforementioned problems, and it is an object of the present invention to improve the conventional techniques used to produce a DNA array, thereby enabling to provide a nucleic acid immobilized carrier which has high cost performance, simplicity and sensitivity.

In the present invention, in order to attain the above objects, by using a first nucleic acid strand immobilized on a first substrate as so-called template, a second nucleic acid strand which is used as a probe nucleic acid strand is synthesized, and then, the resulting second nucleic acid strand is transferred to and immobilized on a second substrate by making use of an electric field, thereby producing a nucleic acid immobilized carrier.

Accordingly, the present invention provides a method for producing a nucleic acid immobilized carrier provided with a second nucleic acid strand of a predetermined sequence immobilized on, the method comprising the steps of:

preparing a first nucleic acid immobilized carrier which has a first nucleic acid strand immobilized on a first substrate, the first nucleic acid strand having a nucleotide sequence complementary to that of the second nucleic acid strand;

synthesizing a second nucleic acid strand along the first nucleic acid strand in a nucleic acid synthesizing solution, the second nucleic acid strand having a nucleotide sequence complementary to that of the first nucleic acid;

disposing a second substrate such that the second substrate faces toward one side of the first substrate, on which sides the first nucleic acid strand are immobilized; and applying an electric field directed toward the first substrate from the second substrate to cause migration of the second nucleic acid strand, which has been synthesized along the first nucleic acid strand, onto the surface of the second substrate, thereby effecting immobilization of the second nucleic acid strand on the surface of the second substrate.

In the present invention, a pair of electrodes is used as means of applying the electric field. The electrodes are used by respectively disposing them outside of the first and the second substrates. Alternatively, instead of using the electrode separated from the substrate, the electrode and the substrate may be integrated into a composite electrode, which can be made by coating the first substrate and/or the second substrate with a conductive film.

In the present invention, a plurality of the first and the second nucleic acid strands may be used. In this case, although the nucleic acid strands may have the same sequences, it is preferable that these strands have a different sequence, respectively. In this case, when the composite electrode is used, it is preferred that the surface of the conductive film is divided into plural electrode regions by using insulation patterns, and a different nucleic acid probe strand is immobilized in each electrode region. Alternatively, different nucleic acid strand may be immobilized on the same electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be hereinafter explained in detail.

In the present invention, the second nucleic acid strand described above may be any one of RNA, DNA, PNA (peptide nucleic acid) and analogues thereof, but preferably, DNA is used. Also, no particular limitation is imposed on the first nucleic acid strand, and synthesized oligonucleotides, cDNAs, RNAS, PNAs, methyl phosphonates or the like may be used.

There is no particular limitation to carrier materials used for the first and second substrates of the present invention and, for example, an inorganic insulation material such as glass, quartz glass, alumina, sapphire, forsterite, silicon carbide, silicon oxide or silicon nitride may be used. An organic material such as a polyethylene, ethylene, polypropylene, polyisobutylene, polyethylene terephthalate, unsaturated polyester, fluorine-containing resin, polyvinyl chloride, polyvinylidene chloride, polyvinyl acetate, polyvinyl alcohol, polyvinyl acetal, acrylic resin, polyacrylonitrile, polystyrene, acetal resin, polycarbonate, polyamide, phenol resin, urea resin, epoxy resin, melamine resin, styrene-acrylonitrile copolymer, acrylonitrile-butadiene-styrene copolymer, silicone resin, polyphenylene oxide or polysulfone may also be used. In addition, a membrane usable for nucleic acid blotting such as nitrocellulose membrane, PVDF membrane and so on can be employed. Also, electrode materials explained below are used to make a composite electrode functioning as a substrate and an electrode, which can be obtained by coating the insulated substrate with a conductive film made of the electrode material. In the case of using such a composite electrode, it is preferred that the surface of the conductive film is partitioned into a plurality of isolated electrode regions by an insulation layer regions, and a different nucleic acid strand is immobilized on each isolated electrode region.

No particular limitation is imposed on materials for the electrode, and metal such as gold, silver, platinum, mercury, nickel, palladium, silicon, germanium, gallium and tungsten or an alloy of these metals, as well as carbon such as graphite, glassy carbon, or an oxide or compound of these carbon materials may be used. Further, a semiconductor compound such as silicon oxide or various semiconductor device such as a CCD, FET or CMOS may be used.

In the case of using a composite electrode produced by forming a conductive film on an insulated substrate to integrate the substrate with the electrode, this conductive film may be formed by plating, printing, sputtering or evaporation. When evaporation coating is adopted, the conductive film may be formed by a resistance heating method, high frequency heating method or electron beam heating method. When sputtering is performed, the conductive film may be formed by d.c. double pole sputtering, bias sputtering, asymmetrical a.c. sputtering, getter sputtering or high frequency sputtering. Moreover, an electrolytic polymer film or conductive polymer such as polypyrrole or polyaniline may be used.

In the present invention, although no particular limitation is imposed on the insulation material to be used for partitioning the electrode surface, the insulation material may preferably be a photo-polymer or photoresist material. As the resist material, a photoresist for light exposure, photoresist for far ultraviolet rays, photoresist for X rays or photoresist for electron rays may be used. Examples of the photoresist for light exposure include those produced from cyclized rubber, polycinnamic acid or a novolac resin as major component. As the photoresist for far-ultraviolet rays, cyclized rubber, a phenol resin, polymethylisopropenyl ketone (PMIPK) or polymethylmethacrylate (PMMA) is used. As the resist for X rays, in addition to a COP and methacrylate, materials described in Thin Film Handbook (Ohm Corporation) may be used. As the resist for electron rays, a material such as a PMMA described in the above literature may be used.

The thickness of the film used here is desirably not less than 100 Å and less than 1 mm. When the electrode is coated with photoresist, and then, subjected to lithography, it is possible to make the area of the electrode region constant. This ensures that the immobilization amount of the nucleic acid strand is uniform among the different electrode regions, thereby enabling measurements with high reproducibility. Conventionally, a resist material is finally removed in general, however, a resist material may be used as a part of an electrode without removing it in the case of the composite electrode of the present invention. In this case, it is necessary to use a highly water-resistant material as the photoresist material. For the insulation layer to be formed on the conductive film surface of the composite electrode, a material other than photoresist materials may also be used. For example, oxides, nitrides, carbides of Si, Ti, Al, Zn, Pb, Cd, W, Mo, Cr, Ta and Ni can be used, and further, alloys of these metal element may be used. Each of these materials is used to form a thin film by using sputtering, vapor deposition, CVD or the like, and then, the patterning of the exposed portion of the electrode is carried out using photolithography for controlling the area to a constant value.

When the composite electrode is used, the nucleic acid immobilized carrier obtained by the present invention can be constituted so that several electrode regions are formed on one devise and a different probe nucleic acid strand is immobilized on each electrode region, whereby several target genes can be inspected simultaneously. Also, several electrode regions may be formed on one device and the same probe nucleic acid strand may be immobilized to each electrode region, whereby several specimens can be inspected simultaneously. In this case, a pattern of plural electrodes is formed in advance on the substrate by utilizing photolithography. At this time, it is effective to partition each electrode by an insulation film patterns so that neighboring electrodes are not in contact with each other. The height of each partition is preferably about 0.1 µm to 100 µm.

There is no particular limitation to a method for the producing a first nucleic acid strand immobilized carrier serving as a template for nucleic acid synthesis, the first carrier comprising the first nucleic acid strand immobilized on the surface of the first substrate. For example, it is possible to adopt a direct synthesis method by photolithography which employs an optically active reagent (Fodor et al. 1991). Alternatively, use may be made of a method in which a nucleic acid strand produced in advance is immobilized on a first substrate by dripping the nucleic acid strand on the substrate using, for example, a micropipet or an ink jet. It is preferable that a spacer be interposed between the first nucleic acid strand to be immobilized and the first substrate.

Next, the first nucleic acid immobilized carrier produced in a manner described above is immersed in an electrolyte solution, namely a nucleic acid synthesizing solution containing a primer, a nucleic acid synthase enzyme and a nucleotide monomer. Then, nucleic acid synthesis reaction or nucleotide polymerase reaction is effected using the first nucleic acid strand as a template, thereby synthesizing the second nucleic acid strand having a sequence complementary to that of the first nucleic acid strand. Then, the second substrate for immobilizing the second nucleic acid strand is prepared and placed close to or adjacent to the first substrate, and preferably, so as to face the first substrate in the electrolytic solution. The distance between the first and the second substrates varies depending on the length of the nucleic acid strands. It is preferred, however, that the first and the second substrate are made contact each other so as to limit the migration distance of the second nucleic acid strand to the second substrate to be 1 mm or less, or the two substrate are placed so as to set the distance between them to be 1 mm to 10 nm. Subsequently, the electrolyte solution is brought to the condition in which a double-stranded DNA is denatured, such as temperature of 90° C. or more. Note that the denaturation may be achieved by using urea and alkaline solution containing sodium chloride, and so on. In addition, it is possible to denature the double stranded DNA by application of potential. At this time, a positive potential is applied to the second substrate used for immobilizing the second nucleic acid strand, while a negative potential is applied to the first substrate having the first nucleic acid strand immobilized thereon, thereby applying an electric field directed toward he first substrate from the second substrate. In this case, both the first and the second substrate are required to be a composite electrode. The potential gradient is preferably about 0.1 to 100 V/cm. Because the nucleic acid strand is negatively charged in general, the nucleic acid probe strand synthesized on the first substrate is transferred to the surface of the second substrate and immobilized thereon by this operation.

In order to immobilize the second nucleic acid strand on the surface of the second substrate, use can be made of means well known to a person skilled in the art such as covalent bond, affinity coupling or electrostatic coupling. Specifically, the end of the second nucleic acid strand is modified by a reactive functional group such as an amino group, carboxyl group or thiol group; and a protein, such as biotin or avidin, which forms a specific affinity pair, while the surface of the second substrate for immobilizing the second nucleic acid strand is modified by a molecule, such as a silane coupling agent, having a reactive functional group; a protein, such as biotin or avidin, which forms a specific affinity pair; a negatively charged amino acid and the like. This enables the second nucleic acid strand to be immobilized on the surface of the second substrate more firmly. Furthermore, it is possible to improve the efficiency of detection by introducing a proper spacer, for example, a conductive polymer such as a polyacetylene, polypyrrole, polythiophene or polyaniline, or an alkyl group or a polyethylene between the substrate and the functional group. Also, when gold is used as the conductive film of the composite electrode, sulfur having a high affinity with gold may preferably bonded to the end of the second nucleic acid strand.

Also, the first nucleic acid strand can be immobilized to a first substrate made of a material other than electrode materials, such as glass, silicon, silicon oxide, silicon nitride, synthetic polymers, nitrocellulose films or nylon films. In this case, the following method may be used. Specifically, at the step of transferring the second nucleic acid strand to the second substrate after being synthesized on the first nucleic acid strand as a template, the second substrate is used as an electrode, and another electrode is disposed on the opposite side from the second substrate so as to sandwich the first substrate having the first nucleic acid strand immobilized thereon. Then, a potential is applied between the second substrate and the another electrode. Note that the potential applied on the second substrate is set to be relatively positive.

Alternatively, the synthesized second nucleic acid strand can also be immobilized on a second substrate made of a material other than electrode materials, such as glass, silicon, silicon oxide, silicon nitride, synthetic polymers, nitrocellulose films or nylon films. In this case, at the stage of transferring the second nucleic acid strand synthesized the first electrode substrate to the second substrate, another electrode is disposed on the opposite side from the first substrate so as to sandwich the second substrate, and a potential is applied between the first substrate and the another electrode. Note that the potential applied on the first substrate is set to be relatively negative.

It is also possible to use materials other than electrode materials for both of the first and the second substrates by combining the two embodiments described above. In this case, two electrodes may be disposed outside of the first and the second substrates respectively, and potential may be applied between the two electrodes placed outside of the first and the second substrates. Note that the potential applied on the electrode placed outside of the second substrate is set to be relatively positive.

In the present invention, no particular limitation is imposed on the nucleic acid synthase enzyme used to synthesize the second nucleic acid strand from the template (i.e., the first nucleic acid strand), and the enzyme may be selected from various DNA synthaseenzymes and RNA synthase enzymes.

When a cDNA is used for the first nucleic acid strand, the second nucleic acid strand may be synthesized using a random primer. Also, when oligonucleotide is used for the first nucleic acid strand, a spacer molecule such as a polybenzyl glutamate (PBLG) and/or polyethylenglycol may be conjugated with the end of the oligonucleotide in advance. Further, if a common sequence is incorporated into the first nucleic acid strand, the second nucleic acid strand can be synthesized using a primer complementary to the common sequence.

The nucleic acid immobilized carrier produced according to the present invention can be used for the detection of various genes without any limitation to genes to be detected. Example of the genes for detection includes viral genes of infectious diseases such as a hepatitis virus (A, B, C, D, E, F and G type), HIV, influenza virus, herpes group virus, adenovirus, human polyoma virus, human papilloma virus, human parvovirus, mumps virus, human rotavirus, enterovirus, Japanese encephalitis virus, dengue virus, rubella virus and HTLV; microorganism genes such as Staphylococcus aureus, cythemolytic streptococcus, pathogenic colibacillus, enteritis vibrio, Helicobacter pylori, Campylobacter, vibrio cholerae, dysentery bacillus, Salmonella, yersinie, gonococcus, listeria monocytogenes, leptospire, legionella bacillus, spirochaete, Mycoplasma pneumoniae, rickettsia, Chlamydia, malaria, Entamoeba histolytica and pathogenic fungi; parasites and fungi. Also, the nucleic acid immobilized substrate of the present invention can be used to detect hireditary diseases and neoplastic diseases such as retinoblastoma, Wilms, tumor, familial intestinal polyposis, hireditary nonpolyposis colic cancer, neurotic fibromatosis, familial breast cancer, xeroderma pigmentosum, brain tumor, stomatic cancer, esophageal carcinoma, carcinoma of the stomach, colic cancer, hepatic cancer, pancreatic cancer, lung cancer, thyroidal tumor, mammary tumor, urinary tumor, tumor of male genital organs, tumor of female genital organs, ecphyma, tumor of bones and soft parts, leukemia, lymphoma and solid tumor. The nucleic acid immobilized substrate can also be applied to the polymorphism analysis such as RFLP or SNPs and the analysis of nucleotide sequences. The nucleic acid immobilized substrate array can also be applied to, other than medical fields, all of those which require the detection of genes in the field of food inspection, quarantine, inspection of medical products, forensic medicine, agriculture, zootechnics, fishery and forestry. The nucleic acid immobilized substrate can also be used to detect genes amplified by a PCR, SDA or NASBA method. The target genes may be labeled in advance using an electrochemically active substance, fluorescent material such as an FITC, rhodamine or acridine, enzyme such as alkali phosphatase, peroxidase or glucose oxidase, hapten, luminous material, antibody, antigen, colloid particle such as gold colloid, metal, metal ion, and further, metal chelate of each of these metals with trisbipyridine, trisphenanthroline or hexamine.

There is no particular restriction on a sample which is subjected to gene detection using the nucleic acid immobilized carrier obtained in the present invention. For example, blood, serum, leukocyte, urine, stool, semen, saliva, tissue, cultivated cell and expectoration may be used. A nucleic acid component is extracted from these specimens. There is no particular limitation to the extraction method, and a liquid-liquid extraction such as a phenol/chloroform method or a solid-liquid extraction using a carrier may also be used. Also, a commercially available nucleic acid extraction method such as a QIAamp method (produced by QIAGEN) or Sumi Test (produced by Sumitomo Metal Industries) can also be utilized.

Next, a hybridization reaction is conducted between the extracted nucleic acid component and a nucleic acid immobilized substrate for gene detection. The reaction is effected in a buffer solution having an ionic strength ranging from 0.01 to 5 and a pH ranging from 5 to 10. In this solution, addition can be made of dextran sulfate, salmon sperm DNA, bovine thymus DNA, EDTA and surfactants as promoters of hybridization. Namely, the extracted nucleic acid component is added to the solution and denatured under the temperature at 90° C. or more. In gene detection, the nucleic acid immobilized carrier obtained by the present invention may be immersed into the solution either directly after the denaturing or after the solution is accurately cooled to 0° C. Also, it is possible to effect the hybridization reaction by dripping the solution on the substrate. Operations such as stirring and shaking may be carried out during reaction to promote the reaction rate. The reaction temperature is in a range between 10 and 90° C. and the reaction is run for one minute and about one night. After the hybridization reaction is finished, the electrode is removed from the solution and washed. For the washing, a buffer solution having an ionic strength ranging from 0.01 to 5 and a pH ranging from 5 to 10 is used.

Among the nucleic acid immobilized carrier obtained by the present invention, the composite electrode having nucleic acid strands immobilized on the conductive film surface is particularly useful when the detection is carried out using DNA-bonding agent which has an electrochemical activity. The detecting operation in this case will be conducted by the following procedure. After the nucleic acid immobilized carrier is washed, a DNA-bonding agent which selectively conjugate with the double-stranded nucleic acid is reacted with the carrier, and the presence of any double stranded nucleic acid portion formed on the electrode is measured electrochemically. There is no particular limitation to the DNA-bonding agent used here and, for example, Hoechst 33258, Acridine orange, quinacrine, daunomycin, metallo-intercalator, bis-intercalator such as bisacridine, tris-intercarator or poly-intercalator may be used. Moreover, these intercalators may be modified using an electrochemically active metal complex such as ferrocene or viologen. The DNA binding-agent is generally used in a concentration ranging from 1 ng/ml to 1 mg/ml, though the concentration differs depending on the type thereof. At this time, a buffer solution having an ionic strength ranging from 0.001 to 5 and a pH ranging from 5 to 10 is used. The electrode is reacted with the DNA-binding agent and washed, followed by being measured electrochemically. The electrochemical measurement is made using a measuring apparatus of three-electrode type, specifically, a reference electrode, counter electrode and working electrode, or a two-electrode type, specifically a counter electrode and working electrode.

In this measurement, a potential no lower than that required for the DNA-binding agent to electrochemically respond for generating detectable electric current is applied, and the generated current value of the reaction current derived from the DNA binding material is measured. At this time, the potential may be swept at constant rate, applied as pulses, or constant potential may be applied. In the measurement, instruments such as a potentiostat, digital multimeter and function generator are used to control current and voltage. Based on the resulting current value, the concentration of a target gene is calculated from the calibration curve. A gene detecting apparatus using the nucleic acid immobilized electrode comprises a gene extraction section, gene reaction section, DNA-binding agent reaction section, electrochemical measurement section, washing section and the like.

Also, if the sample is provided with a fluorescent label in advance is used, or if a nucleic acid strand provided with a fluorescent label is used as a second probe, the detection of a gene can be made by taking fluorescent intensity as the index. At this time, if a fluorescence microscope is used in combination with the above measures, the detectable limit of integration density of the nucleic acid strand can be increased.

As outlined above, the use of the method for synthesizing a nucleic acid strand according to the present invention ensures that nucleic acid strands differing in sequence can be continuously synthesized on the same support, whereby the operation of synthesizing nucleic acid strands is made simple. In addition, nucleic acid strands can be synthesized at low costs. Furthermore, if the nucleic acid strand immobilized electrode manufactured by the method of the present invention is used, electrochemical detection of genes can be attained with the result that the sequence of a nucleic acid can be inspected simply with high sensitivity.

The present invention will be now described hereinafter in more detail by way of Examples.

Example 1

Filter Immobilized with a First Nucleic Acid Strand (Template)

For immobilization, 1.5 kb of a fragment obtained by amplifying an rDNA of colibacillus and a synthetic DNA were used. With regard to the rDNA, two samples were prepared. One sample was 100 μg/ml (0.2 mol/L of sodium chloride and 5 mmol/L of a phosphoric acid buffer solution (pH 7)) of a thermally denatured rDNA and the other sample was 100 μg/mL (0.2 mol/L of sodium hydroxide) of an rDNA which was denatured by an alkali. As the synthetic DNA, 20 μg/mL of 90 mer oligonucleotide (10 mmol/L of a phosphoric acid buffer solution (pH 7)) was used. 1 μL of each of these DNAs was spotted on a nylon filter, dried naturally and then washed with a hybridization buffer solution (2×SSC-1 mmol/L of EDTA (pH 7)), followed by baking at 80° C. for one hour in an oven.

Example 2

Electrode Immobilized with a First Nucleic Acid Strand (Template)

For immobilization, 1.5 kb of a fragment obtained by amplifying an rDNA of colibacillus and a synthetic DNA were used. With regard to the rDNA, two samples were prepared. One sample was 100 μg/ml (0.2 mol/L of sodium chloride and 5 mmol/L of a phosphoric acid buffer solution (pH 7)) of a thermally denatured rDNA and the other sample was 100 μg/mL (0.2 mol/L of sodium hydroxide) of an rDNA which was denatured by an alkali. As the synthetic DNA, 20 μg/mL of 90 mer oligonucleotide thionate (10 mmol/L of a phosphoric acid buffer solution (pH 7)) was used. 0.2 μL of each of these DNAs was spotted on a gold electrode which was 5 by 5 mm square and dried naturally.

Example 3

Synthesis of a Second Nucleic Acid Strand using a First Nucleic Acid Strand Immobilized on a Filter as a Template A second nucleic acid strand was synthesized on the nylon filter of Example 1 having a nucleic acid strand immobilized thereon. For the synthesis, a nucleic acid strand labeling kit (fluorescein isothiocyanate (FITC)) available from Pharmacia Aktiebolag was used. 100 μL of a reagent consisting of a nucleotide mix, a random primer and polymerase (klenow) was dripped on the filter and reacted at 37° C. for one hour in a hybribag. After a blocking and a washing operation were performed, the product was reacted with an alkali phosphatase labeled anti-FITC antibody for one hour. The resulting product was washed, and then, a luminous substrate CDP-Star was dripped on the product. As a result, emission was observed only from the portion on which the DNA was spotted. It was thus confirmed that a second nucleic acid strand could be synthesized on the filter. However, no emission was observed from the synthetic DNA, and it was therefore considered that no nucleic acid strand was synthesized.

Example 4

Synthesis of a Second Nucleic Acid Strand using a First Nucleic Acid Strand Immobilized on an Electrode as a Template A nucleic acid strand was synthesized on the gold electrode (5 by 5 mm square) of Example 2 having a first nucleic acid strand (template) immobilized thereon. For the synthesis, a nucleic acid strand labeling kit (fluorescein isothiocyanate (FITC)) available from Pharmacia Aktiebolag was used. 20 μL of a reagent consisting of a nucleotide mix, a random primer and polymerase (klenow) was dripped on the electrode and reacted at 37° C. for one hour so as to prevent it from drying. After a blocking and a washing operation were performed, the product was reacted with an alkali phosphatase labeling anti-FITC antibody for one hour. The resulting product was washed, and then, a luminous substrate CDP-Star was dripped on the product. As a result, emission was observed only from the portion on which the DNA was spotted. Also, emission was also observed from the spot of the synthetic DNA on the gold electrode. It was thus confirmed that a nucleic acid strand can be synthesized.

Example 5

Transfer of a Synthesized Second Nucleic Acid Strand from the First Substrate to the Second Substrate The second nucleic acid strand on the nylon filter, which was synthesized according to the method of Example 3, was transferred to a second nylon filter. First, the first nylon filter resulting from Example 3 was brought into contact with the second nylon filter to which the nucleic acid strand was to be transferred. The both filters were disposed in an electrophoretic vessel such that an electric field was applied. The direction of the electric field was set so as to be negative to positive towards the second filter from the first filter. A transfer operation was carried out at a potential gradient of about 20 V/cm for one minute, and then, the second filter was baked at 80° C. The same emission detecting system as in Example 4 was used. As a result, it was confirmed that the synthesized nucleic acid strand was transferred to the second. The first filter resulting from Example 3 was abele to be repeatedly used at least three times as the template for nucleic acid synthesis.

Example 6

Transfer of a Synthesized Second Nucleic Acid Strand from the First Gold Electrode The second nucleic acid strand on the gold electrode, which was synthesized according to the method of Example 4, was transferred to a nylon filter. First, the template gold electrode was brought into contact with the nylon filter to which the nucleic acid strand was to be transferred. The both were disposed in an electrophoretic vessel so that an electric field was applied. The direction of the electric field was set so as to be negative to positive towards the transferred side from the template side. A transfer operation was carried out at a potential gradient of about 10 V/cm for 3 minutes, and then, the filter was baked at 80° C. The same emission detecting system as in Example 4 was used and, as a result, it was confirmed that the nucleic acid strand synthesized on the gold electrode was transferred to the filter. The template electrode resulting from Example 4 was able to be repeatedly used at least three times as the template for nucleic acid synthesis.

Example 7

Detection of a Nucleic Acid Strand on a Second Substrate having a Duplicated Second Nucleic Acid Strand A gene was detected using a filter which has a dupulicated second nucleic acid strand immobilized thereon. A PCR product of an rDNA was used as a target gene which was labeled in advance using FITC. 100 µL of the target gene which was thermally denatured was dripped on the filter obtained in Example 5 and reacted at 37° C. for one hour in a hybribag. After a blocking operation and a washing operation were performed, reactiton with an alkali phosphatase-labeled anti-FITC antibody was performed for one hour. After washing was performed, CDP-Star, i.e., a luminous substrate, was dripped on the resulting filter. As a result, emission was observed only from the portion on which the DNA was spotted. It was thus confirmed that a target nucleic acid strand could be detected on the duplicated filter. The same degree of detection was attained in the case of the filter duplicated from the electrode in Example 6.

Example 8

Structure of a Composite Electrode used to Immobilize a Nucleic Acid Strand

Figure 1:
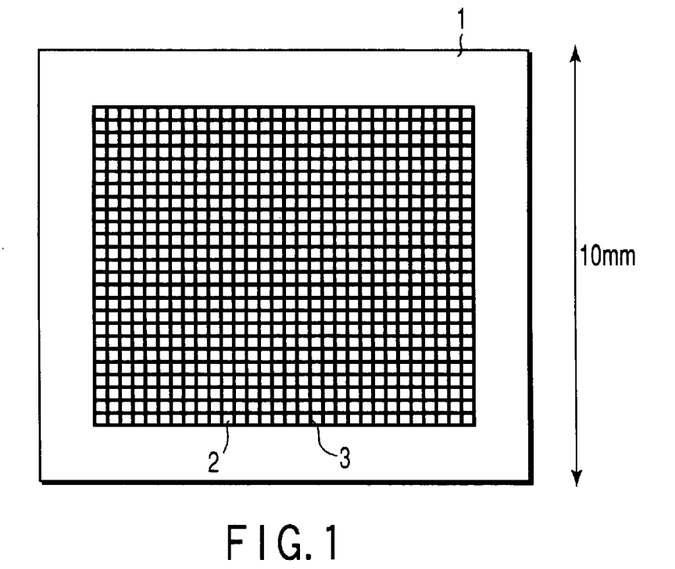
FIG. 1 is a schematic view showing an electrode carrier used for producing a nucleic acid immobilized carrier, according to an embodiment of the present invention.

FIG. 1 is a plan view typically showing first or second electrode substrate used to immobilize a first or second nucleic acid strand respectively, in the present invention. In the figure, the reference number 1 represents a glass substrate which is 1 by 1 cm square. 30×30 gold electrodes 2 which are each 100 by 100 µm square are formed on a substrate 1 by patterning. The electrodes 2 are separated from each other by an insulation film 3 having a width of 50 µm and a lead wire (not shown) of each electrode is taken out from the back surface.

Example 9

Figure 2:
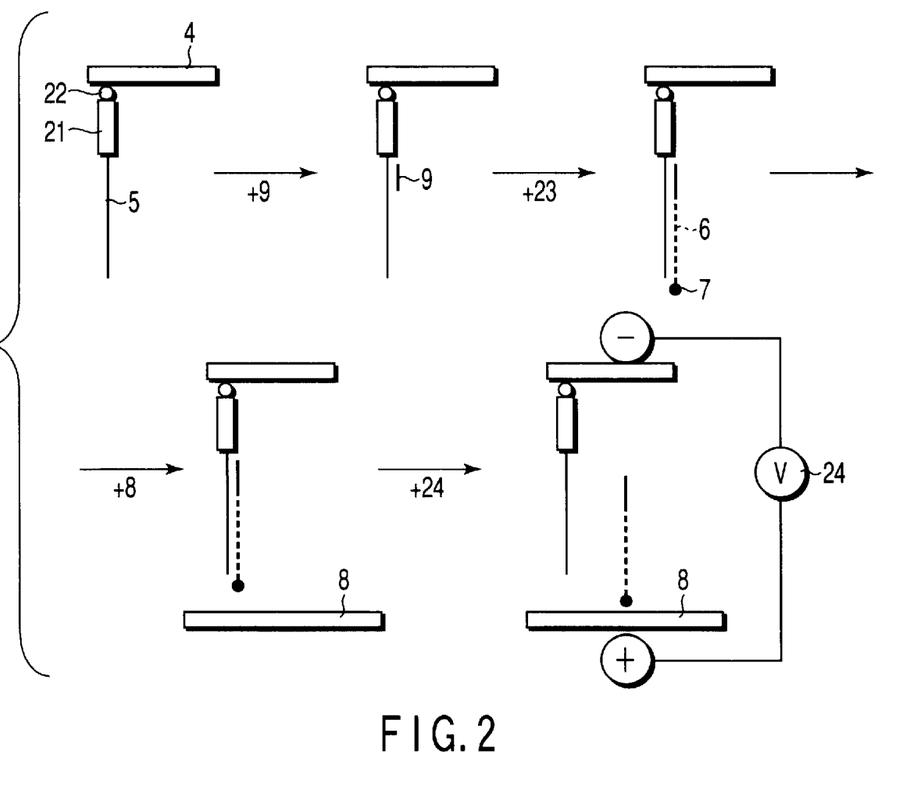
FIG. 2 is a view showing a method for producing a nucleic acid immobilized carrier by using a composite electrode, according to the present invention.

Synthesis of a Nucleic Acid Strand using composite Electrode having Nucleic Acid Strand Immobilized Thereon FIG. 2 is an explanatory view typically showing an example of the production process of a nucleic acid strand immobilized array using a composite electrode, and also showing the mechanism of the nucleic acid synthesis in the production process. By using micropipettes, solutions of 30-mer oligonucleotides 5 each of which has a different sequence are respectively, dripped onto the electrode regions 2 of the electrode substrate shown in FIG. 1, thereby to produce a first electrode substrate 4 which has a first nucleic acid strand 5 used as a template for synthesizing a second nucleic acid strand (i.e., a probe). A polybenzyl glutamate (PBLG) 21 having a molecular weight of 1000 was bonded to the end of the oligonucleotides 5 in advance and further a thiol group 22 was introduced into the end of the PBLG.

Next, the first electrode substrate 4 on which a first nucleic acid strands have bee immobilized was immersed in a solution containing dNTPs, a DNA synthase enzyme 23 and primers 9 to synthesize a complementary strand, i.e., a second nucleic acid strand 6. In the synthetic process, the primers are attached to the first nucleic acid strand through hybridization, and then, the DNA synthase enzyme serves to synthesize the complimentary strand 6. A thiol group 7 was introduced at the end of the synthesized second nucleic acid strand. Then, the first electrode substrate 4 having the first nucleic acid strand immobilized thereon and a second composite electrode 8 are disposed such that the gold electrode surface of the second composite electrode faces to the gold electrode surface of the first composite electrode, followed by immersing the both composite electrodes 4 and 8 into 100 mmol/L of a phosphoric acid buffer solution with the disposition of the two composite electrodes maintained. While heating to 95° C., a potential of +500 mV was applied to the second composite electrode 8 by using the first composite electrode 4 as the counter electrode (24), thereby generating electric field directing toward the first composite electrode from the second composite electrode. By this operation, the second nucleic acid strands were transferred to the corresponding electrode regions of the second composite electrode 8 and the thiol group 7 was attached to the gold electrode. As a result, the second nucleic acid substrate having different sequences were immobilized respectively onto 30×30 pattern electrode regions. The first composite electrode 4 having the first nucleic acid strands immobilized thereon was able to be repeatedly used at least 50 times as a template for producing the second nucleic acid strand.

Example 10

Indirect Synthesis of a Nucleic Acid Strand on an Electrode

Figure 3:
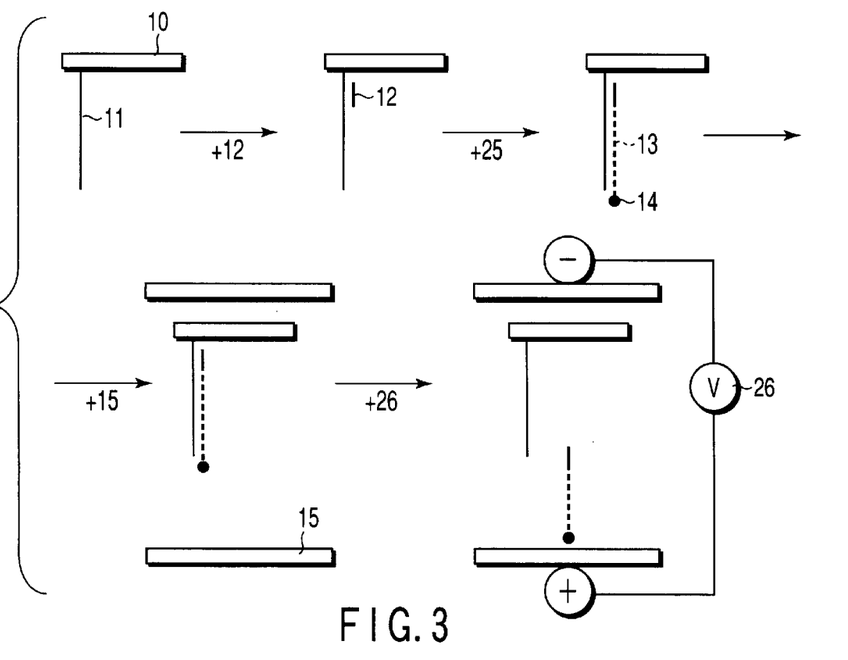
FIG. 3 is a view showing another embodiment of a method for producing a nucleic acid immobilized carrier by using a composite electrode, according to the present invention.

FIG. 3 is an explanatory view typically showing another example of the production of a nucleic acid strand immobilized array using an electrode substrate. In this Example, a first glass substrate 10 on which a first nucleic acid strand used as a template was immobilized was used as the first substrate. This first glass substrate 10 was produced as follows. That is, solutions respectively containing a different cDNA 11 were dripped by using a micropipet in a pattern of 30×30 specimens to produce the first grass substrate 10. Then, the first glass substrate 10 having the first nucleic acid strands immobilized thereon was immersed in a solution containing dNTPs, a DNA synthase enzyme 25 and a random primer 12 to synthesize a complementary strand or the second nucleic acid strand 13. A thiol group 14 was introduced at the end of the synthesized complementary strand. A second electrode substrate 15 similar to that described in Example 1 and another electrode 16 (counter electrode) are disposed so as to sandwich the first glass substrate 10, and then, these were immersed in a glycine/NaOH buffer solution of pH 12 and a voltage of +500 mv was applied between the counter electrode and the second composite electrode (26). By this operation, the second nucleic acid strand synthesized on the first glass substrate was transferred to and fixed on the second composite electrode 15 of 30×30 patterns. The first glass substrate 10 on which the first nucleic acid strands ware immobilized was able to be used repeatedly at least 50 times.

Example 11

Duplication of a template substrate

Figure 4:
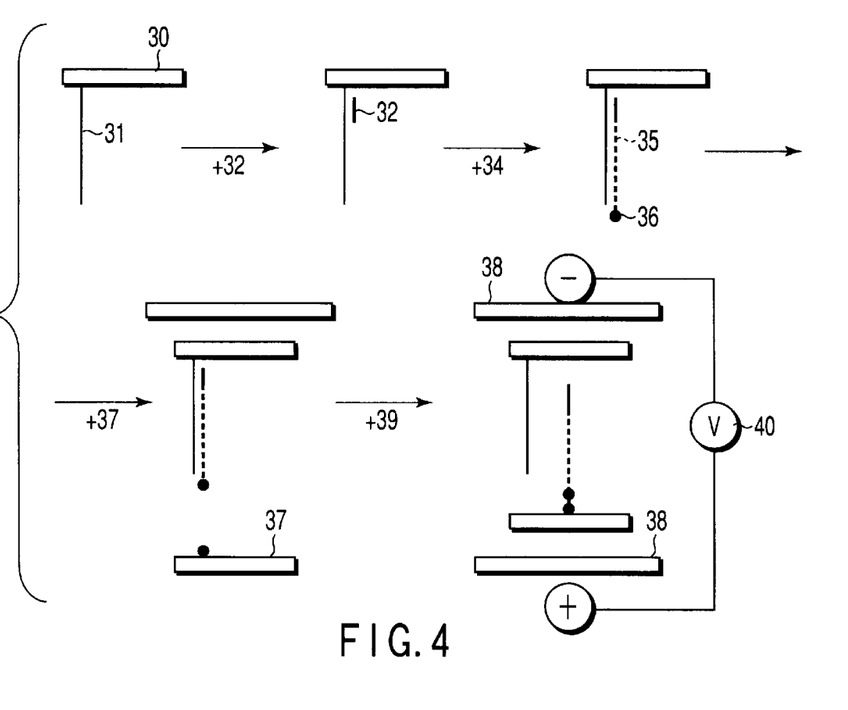
FIG. 4 is a view showing still another embodiment of a method for producing a nucleic acid immobilized carrier by using an electrode, according to the present invention.

FIG. 4 is a view showing one example of a method for producing a replica (second substrate) of a template substrate (first substrate). A glass substrate (first substrate) on which a first nucleic acid strand as a template has been fixed was manufactured in such a manner that solutions containing a different cDNAs is dripped on the first glass substrate by using a micropipettes into 30×30 patterns. Next, the first glass substrate on which the first nucleic acid strands has been immobilized was immersed in a solution containing dNTPs, a DNA syntase enzyme 25 and a random primer to synthesize a complementary strand (second nucleic acid strand). A thiol group was introduced at the end of the synthesized complementary strand through polyethylene glycol having a molecular weight of 1000. A second substrate was treated, in advence, with γ-aminopropyltriethoxysilane and then using N-(6-maleimidocaproyloxy) succinimide and N-succinimidyl-6-maleimidohexanone (EMCS) so as to introduce a thiol-reactive functional group onto the surface of the substrate. In order to produce a replica of the first substrate, the second substrate is disposed so as to face with the first nucleic acid strand side of the first substrate and two electrodes were respectively disposed on outside of the first glass substrate (template) and the second substrate. The first substrate, the second substrate and the two electrodes were immersed in 10 mmol/L of a phosphoric acid buffer solution (pH 7), and then, heated to 80° C. while applying a potential of +500 mV between the two electrodes. By this operation, the second nucleic acid strands synthesized on the first glass substrate were respectively fixed by an S—S bond to the second substrate with a 30×30 patterns. The replica manufactured in the above manner was able to be used as the template of a nucleic acid strand synthesis in same manner as the original first substrate, and was able to be repeatedly reused 50 times at least.

It is to be noted that, the method described in Example 9 and 10 required only about 5 minutes to manufacture one DNA array on which 10000 probe nucleic acids was immobilized. On the other hand, the methods explained in the paragraph "Prior Art" required more time. Specifically, 3 days were required in the method in which a DNA strand of a DNA probe was extended every single nucleotide one by one on a substrate (U.S. Pat. No. 5,889,165) and 60 minutes were required in the method in which a DNA probe synthesized in advance was immobilized to a substrate (U.S. Pat. No. 5,807,522).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for producing a nucleic acid immobilized carrier comprising the steps of:
    a) preparing a first nucleic acid immobilized carrier which has a first nucleic acid strand immobilized on a first substrate;
    b) synthesizing a second nucleic acid strand along the first nucleic acid strand in a nucleic acid synthesizing solution, the second nucleic acid strand having a nucleotide sequence complementary to that of the first nucleic acid strand;
    c) disposing a second substrate such that the second substrate faces one side of the first substrate, on which side the first nucleic acid strand is immobilized; and
    d) applying an electric field toward the first substrate from the second substrate to cause migration of the second nucleic acid strand to the surface of the second substrate, and immobilizing the second nucleic acid strand on the surface of the second substrate.

2. The method of claim 1, wherein the migration and the immobilization of the second nucleic acid strand is carried out in an electrolytic solution under conditions which denature a double-stranded nucleic acid into a single-stranded nucleic acid.

3. The method of claim 1, wherein the step of applying an electric field toward said first substrate from said second substrate is performed by providing a pair of electrodes respectively disposed outside of each of said first substrate and said second substrate, and applying a potential between the pair of electrodes.

4. The method of claim 1, wherein a surface of said first substrate or said second substrate or both is made of a conductive material, and the step of applying an electric field directed toward said first substrate from said second substrate comprises applying a potential to the substrate.

5. The method of claim 4, wherein the first or second substrate or both is obtained by coating an insulator substrate with a conductive film and dividing a surface of the conductive film into a plurality of isolated electrode regions by insulation layer patterns formed on the conductive film, the isolated electrode regions being immobilized with the second nucleic acid strand or the first nucleic acid strand having different sequences, respectively.

6. The method of claim 3, wherein at least one of said second substrate and said first substrate are made of a polymer or a glass.

7. The method of claim 1, wherein said first or second nucleic acid strand is selected from the group consisting of RNA, DNA and PNA and analogues thereof.

8. The method of claim 1, wherein bonding between said second nucleic acid strand and-said second substrate is a bond selected from the group consisting of a covalent bond, affinity bond and an electrostatic bond.

9. The method of claim 4, wherein the surface of the second substrate comprises gold, and the bonding between the second nucleic acid strand and the second substrate is effected through an affinity bond between sulfur bonded to the second nucleic acid strand and said gold surface.

10. The method of claim 1, wherein said nucleic acid synthesis solution comprises a primer, a nucleic acid synthesis enzyme, a nucleotide monomer and an electrolyte.

11. The method of claim 2, wherein said condition which denatures the double-stranded nucleic acid into a single-stranded nucleic acid comprises a temperature above 90° C. for the electrolyte solution.

12. The method of claim 11, wherein said nucleic acid immobilized carrier effects gene detection, and the second nucleic acid strand is probe.

13. The method of claim 1, wherein said second nucleic acid strand is DNA.

14. The method of claim 1, wherein a spacer is interposed between the first nucleic acid strand to be immobilized and the first substrate.

15. The method of claim 1, wherein in said step a), said first nucleic acid immobilized on said first substrate directly synthesized by photolithography using an optically active reagent.

16. The method of claim 1, wherein said first nucleic acid strand is immobilized on said first substrate by dripping the nucleic acid strand on the substrate using a micropipette or an ink jet.

17. The method of claim 1, wherein said first and second substrates are each independently inorganic or organic substrates.

18. The method of claim 11, wherein the inorganic substrates comprise glass, quartz, alumina, sapphire, forsterite, silicon carbide, silicon oxide or silicon nitride.

19. The method of claim 11, wherein the organic substrates comprise nitrocellulose membrane or PVDF membranes.

20. The method of claim 1, wherein at least one of said first and second substrates is a composite electrode, which comprises an insulated substrate having thereon a conductive film comprising electrode material.

21. The method of claim 20, wherein both of said first and second substrates is a composite electrode.

22. The method of claim 20, wherein said conductive film is partitioned into a plurality of isolated electrode regions by insulation layer regions, wherein a different nucleic acid strand is immobilized on each isolated electrode region.

23. The method of claim 22, wherein the insulation layer regions comprise a photo-polymer or photoresist material.

24. The method of claim 23, wherein the insulation layer comprises a photoresist material for light exposure.

25. The method of claim 23, wherein the insulation layer comprises a photoresist material for far-ultraviolet rays.

26. The method of claim 23, wherein the insulation layer comprises a photoresist material for X-rays.

27. The method of claim 23, wherein the insulation layer comprises a photoresist material for electron rays.

* * * * *